United States Patent [19]

Roberge

[11] Patent Number: 5,063,652

[45] Date of Patent: Nov. 12, 1991

[54] METHOD FOR INSTALLING TOP BEAM "C" CLAMPS

[76] Inventor: Ronald O. Roberge, 1521 Shenandoah Dr., Cedar Park, Tex. 78613

[21] Appl. No.: 532,437

[22] Filed: Jun. 4, 1990

[51] Int. Cl.⁵ .................. B23P 19/06; B23P 19/08; B25B 13/06
[52] U.S. Cl. .................. 29/525.2; 29/272; 29/278; 29/464; 81/55; 81/124.5
[58] Field of Search .................. 29/426.5, 566, 240, 29/272, 271, 278, 525.1, 525.2, 559, 464, 466; 81/55, 125, 124.4, 124.5

[56] References Cited

U.S. PATENT DOCUMENTS

| | | | |
|---|---|---|---|
| 956,467 | 4/1910 | Anderson | 81/55 |
| 1,089,249 | 3/1914 | Moose | 81/124.5 |
| 1,494,513 | 5/1924 | Stewart | 81/124.5 X |
| 1,618,715 | 2/1927 | Lammers et al. | 81/124.5 X |
| 1,626,730 | 2/1927 | Haynes | 81/124.5 X |
| 2,267,012 | 12/1941 | Bowne | 81/55 |
| 2,775,912 | 1/1957 | Skage | 81/55 |
| 2,790,343 | 4/1957 | White | 81/55 |
| 2,909,089 | 10/1959 | Thompson | 81/55 |
| 3,779,105 | 12/1973 | Triplett et al. | 81/124.5 |
| 4,417,488 | 11/1983 | Gentry | 81/124.4 X |
| 4,882,958 | 11/1989 | McNeeley | 81/124.4 |

FOREIGN PATENT DOCUMENTS 2129352 9/1983 United Kingdom .................. 81/55

Primary Examiner—Timothy V. Eley
Assistant Examiner—Peter Dungba Vo
Attorney, Agent, or Firm—Shaffer & Culbertson

[57] ABSTRACT

An apparatus is adapted for enabling a worker to install a top beam "C" clamp on a roof or ceiling beam, or to remove a previously installed clamp, without having to climb up to the level of the beam. The apparatus includes a structure for supporting the clamp and for positioning the clamp in an installation position on the beam or other suitable member. A socket assembly is associated with the clamp supporting structure and is adapted to drive either the clamp bolt or the nut received on the bolt when the clamp is properly supported on the clamp supporting structure. A driving assembly is connected to the socket assembly to enable the operator of the apparatus to rotate or drive the sockets to rotate either the clamp bolt or the nut received on the bolt. The socket assembly is adapted to be positioned through the driving assembly in either a bolt driving position or a nut driving position in which the bolt and nut, respectively, are properly engaged for driving.

13 Claims, 4 Drawing Sheets

METHOD FOR INSTALLING TOP BEAM "C" CLAMPS

BACKGROUND OF THE INVENTION

This invention relates to an apparatus for installing, retrieving, or operating clamps or similar devices that are secured with a bolt and locking nut arrangement, and particularly, to an apparatus for installing or retrieving top beam "C" clamps. The invention also encompasses methods for installing, retrieving, or operating clamps or similar devices.

Top beam "C" clamps are commonly used to hang pipes for plumbing and fire protection, miscellaneous equipment, and conduit for electrical lines, from roof and ceiling beams or other structural members. Such clamps include an upper and lower jaw connected to a clamp body to form generally a "C" shape. A support member may be connected to the clamp body for supporting the desired equipment or conduit. A bolt with an end portion by which the bolt may be tightened to grip the beam or other suitable member against the upper jaw is threaded through the lower jaw. Top beam "C" clamps also include a locking nut, received on the bolt outside of the lower clamp jaw and having a larger diameter than the bolt end portion. This locking nut may be tightened against the lower clamp jaw to help retain the clamp bolt in a desired tightened position gripping the beam or other member.

Prior to the present invention, top beam "C" clamps were commonly installed from a ladder or suitable work platform. The installer first had to climb in position to place the clamp in the desired installation position on the beam, and then hold the clamp in position with one hand while using a suitable tool to tighten the bolt with the other hand. Once the bolt was tightened to securely grip the beam, a suitable tool was used to tighten the nut against the lower clamp jaw to help lock the bolt in the desired tightened position.

Although top beam "C" clamps were installed manually from ladders for a number of years, there were a number of problems associated with this method of installation. First, the installer had to work at heights which increased the risk of serious injury. Secondly, the installation procedure was time consuming in that it required frequent movement of the ladder and numerous trips up and down the ladder.

It is, therefore, a general object of the invention to provide an apparatus for installing or retrieving top beam "C" clamps that overcomes the above-mentioned problems and others associated with installing and retrieving such devices. It is also an object of the invention to provide a method for installing or retrieving top beam "C" clamps that overcomes the above-mentioned and other problems associated with the prior methods.

SUMMARY OF THE INVENTION

The apparatus according to the invention is adapted to enable a worker to easily and quickly install a top beam "C" clamp (hereinafter sometimes referred to as a "clamp") and to reduce or eliminate his use of a ladder or work platform in the installation process. The apparatus includes clamp support means by which the clamp may be positioned and held in an installation position on a beam or other member, socket means for engaging both the clamp bolt and nut while the support means continuously holds the clamp in position, and driving means for rotating the socket means so as to tighten or loosen the clamp bolt and locking nut. Although the apparatus of the invention is particularly useful for installing top beam "C" clamps, it may also be used for removing previously installed top beam "C" clamps or for remotely operating other devices having similar bolt and locking nut arrangements.

The operation of the apparatus and the method of the invention include first supporting or positioning the clamp to be installed in a clamp operating position on or adjacent to the clamp support means and then holding the clamp in an installation position on the beam or other member where the clamp is to be installed. With the top beam "C" clamp held in the installation position, the method also includes drivingly engaging the bolt end portion with the socket means and then rotating the bolt to a position in which the bolt is tightened so as to grip the beam against the clamp upper jaw. The driving engagement between the socket means and the bolt end portion is preferably made initially as the clamp is positioned in the clamp operating position, but may be made once the clamp is in the installation position. After the clamp bolt is tightened, the installation method continues with the step of drivingly engaging the nut with the socket means and then rotating the socket means to tighten the nut against the outer surface of the lower clamp jaw. Once the bolt and nut are both in the desired tightened position, the apparatus is withdrawn leaving the clamp installed in the desired position.

In the preferred form of the invention, the clamp supporting means includes an elongated extension member, socket housing means connected to a distal end of the extension member, and clamp receiving means comprising two cradle members extending upwardly from the socket housing and forming a clamp receiving slot. The socket means is contained within the socket housing and the two cradle members are adapted to receive and hold the clamp in the operating position on the socket housing. The extension member is preferably a tube having sufficient length to enable an operator to lift the clamp to an installation position substantially above the surface on which the operator is standing.

The preferred socket means includes an inner socket and an outer socket which are adapted to drivingly engage the clamp bolt and nut. The inner and outer sockets are positioned alternatively in a bolt driving position or a nut driving position in which the clamp bolt and nut, respectively, are drivingly engaged so that they may be rotated and tightened or loosened. The outer socket is rotatably received in the socket housing and has an elongated body with a non-circular socket opening extending longitudinally there through. The inner socket has an elongated body and is adapted to be slideably received in the outer socket opening. The inner socket body has a non-circular socket opening adapted to drivingly engage the clamp bolt end portion, and an outer cross-sectional shape adapted to drivingly engage the outer socket body. In operation, the inner socket body is adapted to be positioned in either an extended position to engage the clamp bolt or a retracted position to drivingly engage the outer socket while the clamp nut is engaged within the outer socket.

The preferred driving means includes an elongated drive shaft adapted to extend through the tubular extension member. A distal end of the elongated drive shaft is connected to the inner socket body so that the inner socket may be rotated to drive the clamp bolt or outer socket by rotating the drive shaft about its longitudinal axis within the extension member. The driving means also preferably includes socket position controlling means for selectively retaining the socket means in either the bolt driving position or the nut driving position, for performing the desired operation. The socket position controlling means preferably includes two stop members and a circumferential groove associated or integrally formed with the elongated drive shaft. The two stop members cooperate with a limit stop feature connected to the extension member to effect drive shaft travel limits. A trigger housing connected to the extension member and trigger means connected to the trigger housing also form part of the socket position controlling means. The trigger means is adapted to selectively extend into the circumferential groove or contact one of the stop members to maintain the position of the drive shaft relative to the extension member and thus control the relative position of the inner and outer sockets to drive either the clamp bolt or the clamp nut.

The preferred trigger means includes a trigger member pivotally connected to the trigger housing and having a catch end adapted to pivot between a catch position in which it either extends into the circumferential groove or contacts a stop member, and a release position in which the drive shaft may move longitudinally within the elongated extension member tube. A trigger biasing spring preferably acts between the trigger housing and the trigger member to bias the catch end of the trigger member toward the catch position. Thus, the trigger member must be manually pivoted away from the catch position to the release position to allow the drive shaft to move longitudinally within the extension member. Also, the apparatus preferably includes a positioning spring adapted to act between the drive shaft and the extension member so as to bias the drive shaft to move the inner socket to the retracted position when the trigger is in the release position.

These and other objects, advantages, and features of the invention will be apparent from the following description of the preferred embodiments, considered along with the accompanying drawings.

DESCRIPTION OF THE PREFERRED EMBODIMENTS

FIGS. 1 through 6 illustrate by way of example an apparatus 10 embodying the principles of the invention for installing a top beam "C" clamp. The apparatus 10 is particularly adapted for installing or removing top beam "C" clamps such as the clamp indicated generally at 12 in FIGS. 4, 5, and 7.

Figure 7:
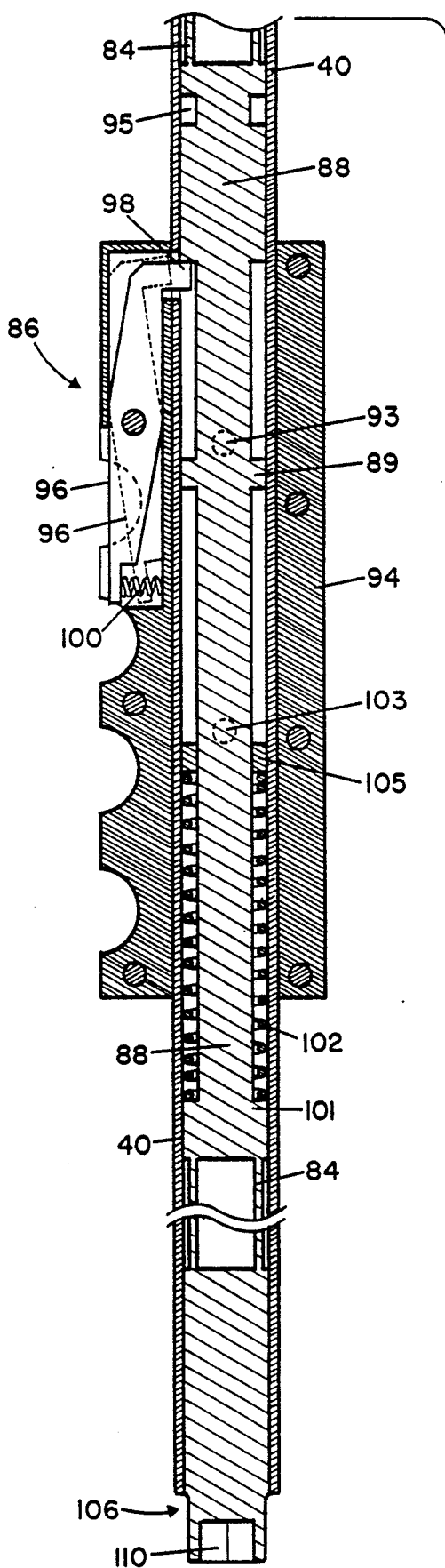
FIG. 7 is a view in side elevation of a top beam "C" clamp to be installed by the apparatus illustrated in FIGS. 1 through 6.
Figure 7:
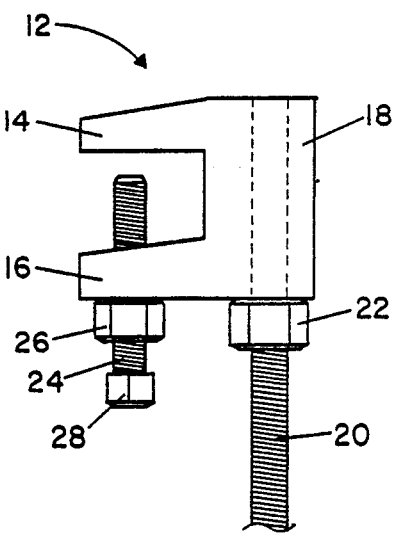
Figure 4:
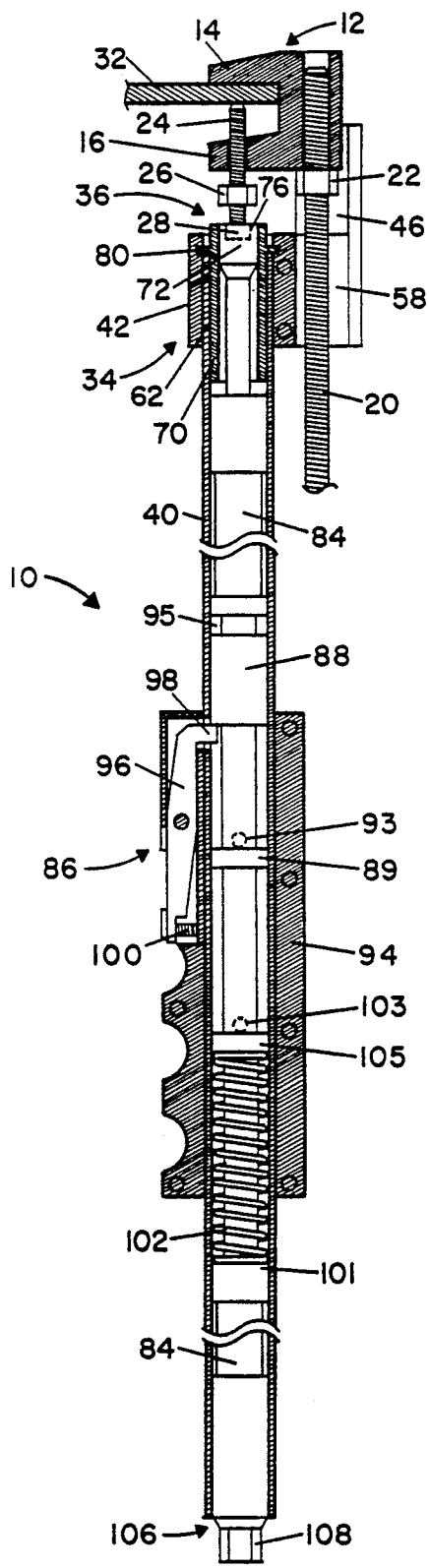
FIG. 4 is a somewhat representational view in partial longitudinal section similar to FIG. 3, showing the apparatus supporting a top beam "C" clamp in an installation position, and the socket means in the bolt driving position.
Figure 5:
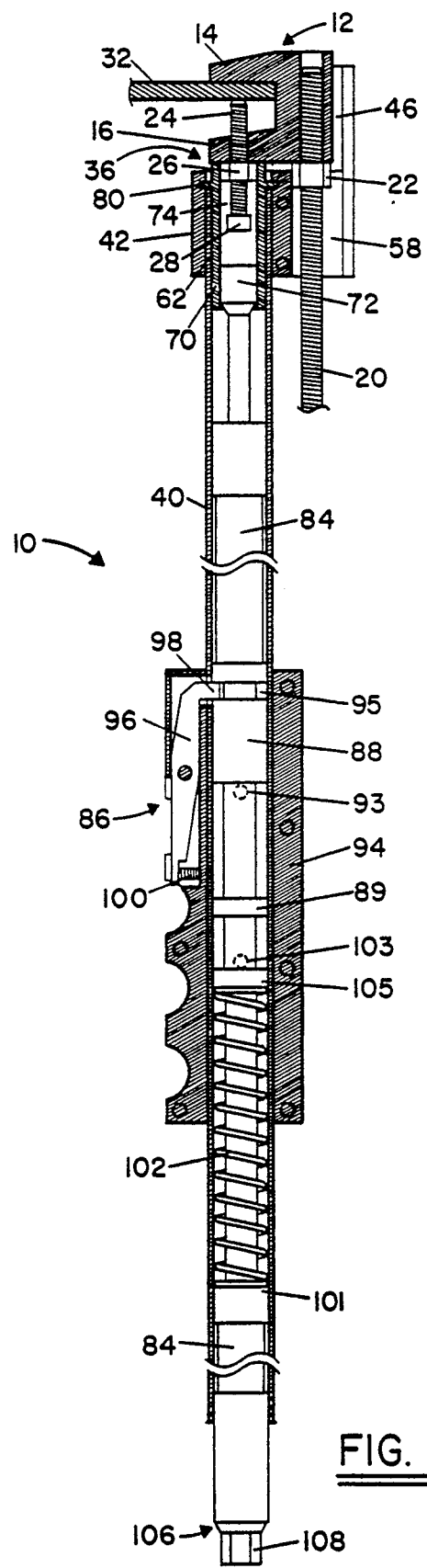
FIG. 5 is a somewhat representational view in partial longitudinal section similar to FIG. 4 but with the socket means in the nut driving position for driving the nut received on the clamp bolt.

Referring particularly to FIG. 7, the clamp 12 includes a generally C-shaped clamp body having an upper jaw 14, a lower jaw 16, and a back portion 18. A suitable support member 20, comprising a length of all-thread rod, is received in a threaded receptacle in the clamp 12 and is adapted to the depend from the clamp in position to support conduit lines or other equipment. A locking nut 22 is shown on the all-thread rod and tightened against the clamp body to help retain the rod in the desired position. The clamp 12 also includes a clamp bolt 24 threaded through a suitable threaded opening in the lower jaw 16 and a locking nut 26 threaded on the bolt below the clamp lower jaw. An end portion 28 having a non-circular cross sectional shape by which the bolt 24 may be engaged and rotated is formed on the bolt. The clamp locking nut 26 also has a non-circular cross sectional shape by which it may be drivingly engaged, but it is larger in diameter than the bolt end portion 28. Referring to FIGS. 4 and 5, the clamp 12 is adapted to be secured on a member 32, commonly a roof or ceiling structural member, by first tightening the clamp bolt 24 so as to grip the member against the clamp upper jaw, and then tightening the clamp locking nut 26 to the position shown in FIG. 7 against the outer surface of the clamp lower jaw 16 to help hold the bolt 24 in the desired gripping position.

Figure 1:
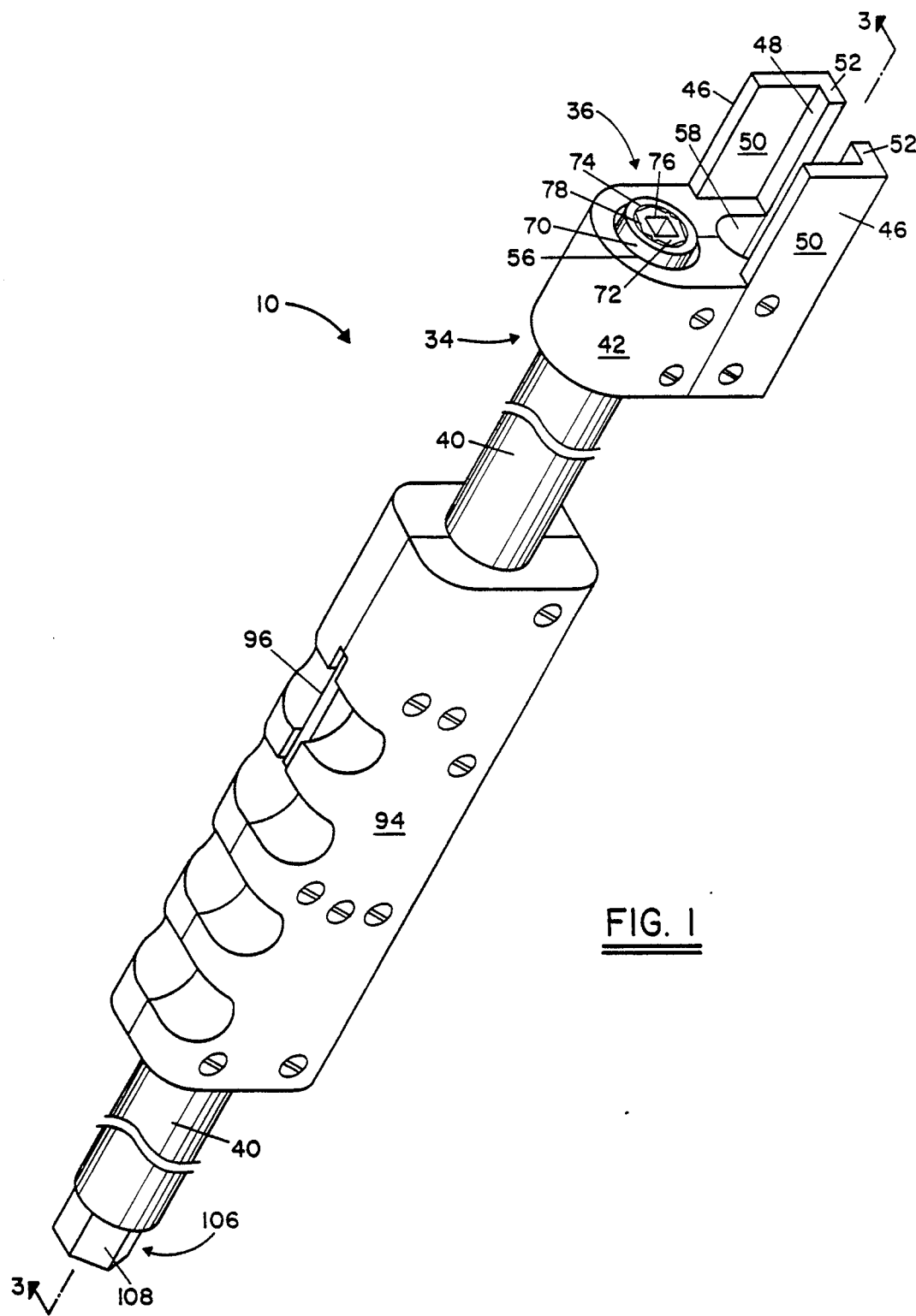
FIG. 1 is a view in perspective of an apparatus embodying the principles of the invention for installing or retrieving top beam "C" clamps.
Figures 2, 6:
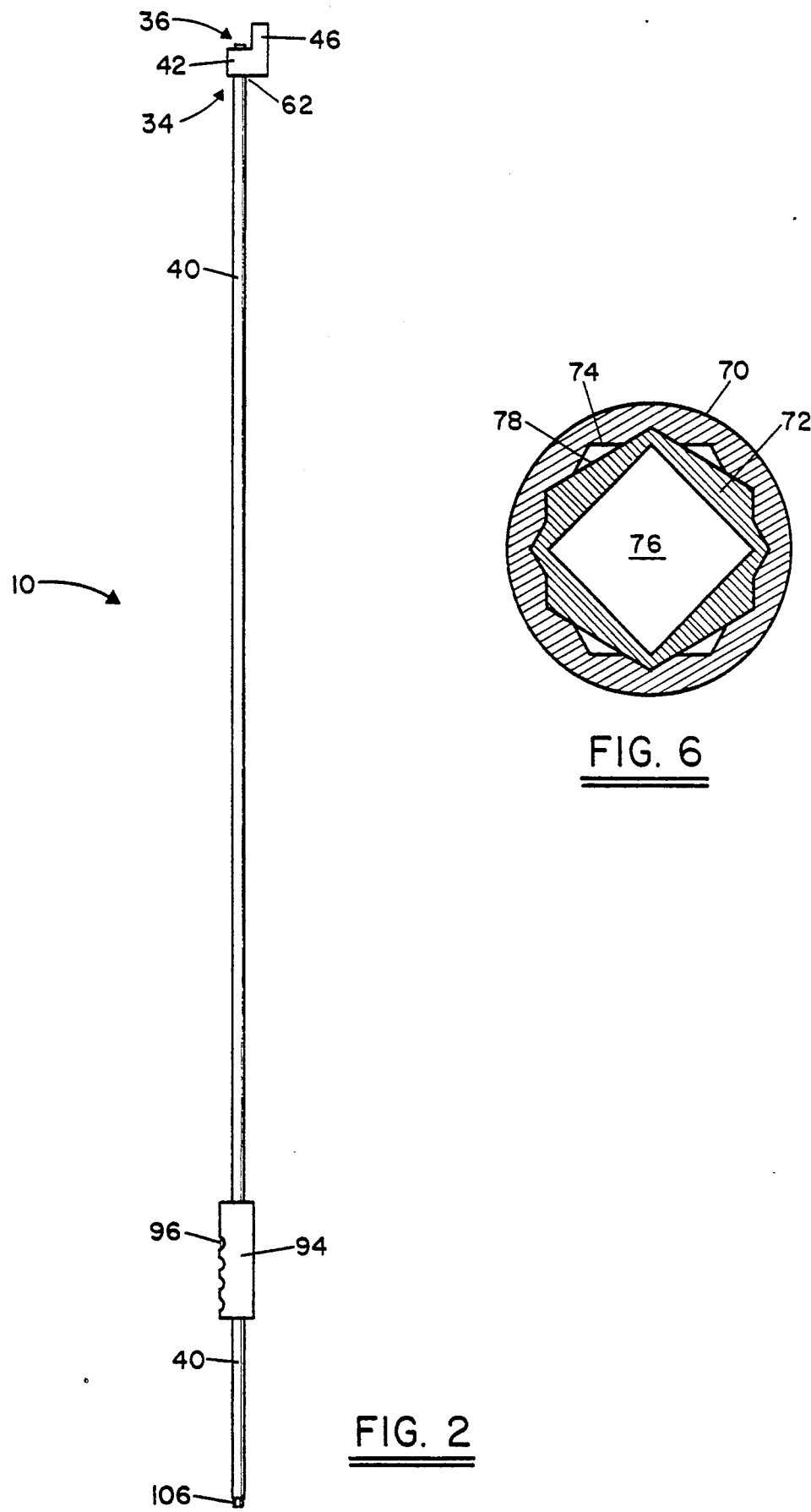
FIG. 2 is a view in side elevation of the apparatus shown in FIG. 1 but drawn to a reduced scale sufficient to show the entire extension member.
FIG. 6 is a view in transverse section taken along line 6—6 in FIG. 3.
Figure 3:
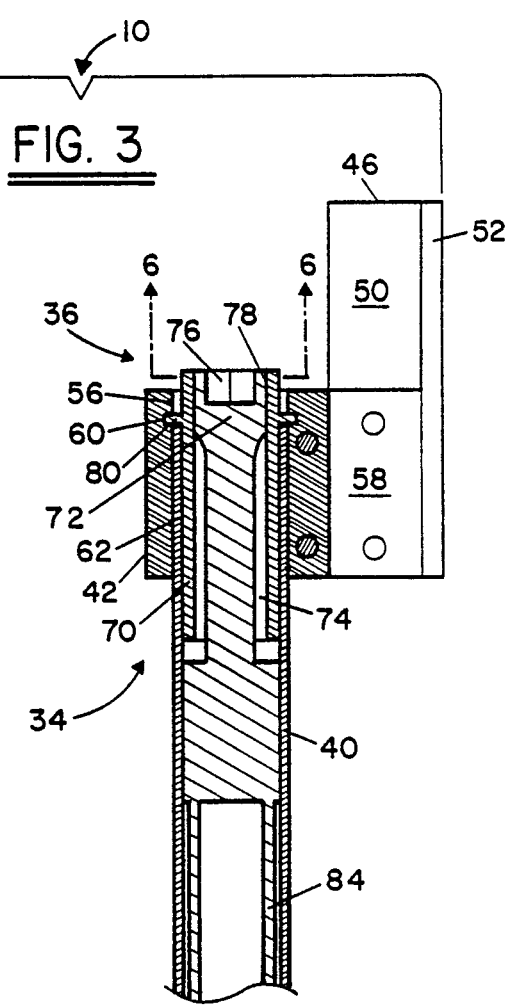
FIG. 3 is a view in longitudinal section taken along line 3—3 in FIG. 1.

Referring now to FIGS. 1 through 3, the clamp installing apparatus 10 comprises clamp supporting means generally indicated at reference numeral 34, socket means 36, and driving means. In the illustrated preferred form of the invention, the clamp supporting means 34 includes an elongated extension member 40, a socket housing 42, and clamp receiving means. The clamp receiving means includes two cradle members 46 that extend upwardly from the socket housing 42 to form a slot or cradle indicated generally at reference numeral 48 (FIG. 1) for receiving and retaining the clamp 12 generally on socket housing 42. The cradle members 46 each include side portions 50 and rear portions 52 for preventing the clamp received in the slot 48 from moving substantially laterally or rearwardly from the socket housing 42.

The preferred socket housing 42 includes a socket receiving opening 56 extending there through and a support member and lock nut receiving area 58 formed toward the rear of the housing to accommodate the support member 20 and lock nut 22 of the clamp 12 received between the cradle members 46. The socket housing 42 also preferably includes a suitable socket retaining groove 60 adapted to cooperate with the socket means 36 as will be described. In one form of the invention, the socket housing 42 is formed from a single piece of aluminum or other suitable material, with the socket receiving opening 56, support member receiving area 58, and socket retaining groove 60 machined or otherwise formed therein. Also, the socket housing 42 is adapted to be received on, and form a connection with, a distal end 62 of the elongated extension member 40.

As shown best in FIGS. 1, 3, and 6, the socket means 36 includes an outer socket body 70 with an inner socket body 72 slideably received in an opening 74 extending longitudinally through the outer socket body. A socket retainer member 80 is connected to or associated with the outer surface of the outer socket body 70 and is preferably adapted to be received in the retainer groove 60 formed in the socket housing 42. This socket retainer member 80 and retainer groove 60 arrangement retains the outer socket body 70 in the socket housing 42 while allowing the outer socket body to rotate about its longitudinal axis. As shown best in FIG. 6, the opening 74 extending through the outer socket body has a non-circular cross sectional shape at least at a distal end thereof. This non-circular cross sectional shape is adapted to receive and drivingly engage the clamp nut 26 received on the clamp bolt 24 as will be described with reference to FIGS. 4 and 5. The inner socket body 72 includes at a distal end thereof a non-circular cross sectional shaped opening 76 adapted to receive and drivingly engage the bolt end portion 28 of the clamp bolt 24. The inner socket body 72 also includes an outer surface 78 having a non-circular cross sectional shape that is adapted to drivingly engage the outer socket body 70 through its non-circular opening 74. Thus, with the inner socket body 72 received in the opening 74 of the outer socket body 70, both the outer and inner socket bodies may rotate about their longitudinal axes in unison.

Referring particularly to FIGS. 3 through 5 the driving means includes a drive shaft 84 connected to a proximal end of the inner socket 72 and rotatably received in the extension member 40, and socket position controlling means 86 for selectively retaining the position of the inner socket body 72 relative to the outer socket body 70. In the preferred form of the invention the socket position controlling means 86 includes upper and lower stop members 88 and 89, respectively, connected to the drive shaft 84, and a trigger housing 94 and limit stop 93 connected to the extension member 40. The limit stop 93 is positioned between the two stop members 88 and 89 and cooperates with the stop members to limit the longitudinal movement of the drive shaft 84 within the extension member 40. Trigger means mounted within the trigger housing 94 is adapted to cooperate with a circumferential groove 95 and the upper stop member 88 to retain and lock the drive shaft 84 in a desired longitudinal position relative to the extension member 40, and thus retain and lock the inner socket body 72 in a desired position relative to the outer socket body 70.

In the illustrated form of the invention a positioning spring 102 is included in the socket position controlling means to act between the drive shaft 84 and the extension member 40 so as to urge the drive shaft and thus the two stop members 88 and 89 downwardly relative to the extension member until the limit stop 93 contacts the stop member 88. As shown in FIGS. 3 through 5 the spring 102 acts between a suitable member 101 on the drive shaft 84 and a fixed stop such as a bolt 103 extending into the extension member 40 from the trigger housing 94. A ring member 105 helps align the spring 102 in a proper biasing position against the bolt 103.

The trigger means includes a trigger member 96 having a catch end 98 that is adapted to pivot between a catch position in which the catch end either extends into the groove 95 or contacts the bottom edge of the upper stop member 88, and a release position (shown in phantom in FIG. 3) in which the drive shaft 84 may move longitudinally relative to the extension member 40. Preferably, the trigger member 96 is pivotally connected to the trigger housing 94 and biased by trigger spring 100 toward the catch position.

Referring now particularly to FIGS. 1 and 3, the drive shaft 84 also includes a driving end 106 that extends somewhat from a proximal end of the extension member 40 opposite the end to which the socket housing 42 is connected. This driving end 106 preferably includes wrench flats 108, a ratchet drive receptacle 110, or both, by which the drive shaft 84 may be drivingly engaged for rotation about its longitudinal axis relative to the extension member 40. Although this shaft driving end 106 is preferred for its simplicity, other driving arrangements for rotating the drive shaft with respect to the extension member may be readily envisioned by those skilled in the art.

The operation of the apparatus 10 and the method of the invention may now be described with particular reference to FIGS. 4 and 5. To install a clamp such as clamp 12, the method includes first supporting or positioning the clamp in a clamp operating position on or adjacent to the clamp support means 34, the clamp preferably being received in the clamp operating position between the cradle members 46. The method next includes holding the clamp in an installation position on the structural member 32 where the clamp is to be installed. Usually this step of holding the clamp in the installation position requires the step of using the extension member 40 to lift the clamp 12 to the installation position. The extension member 40, which may be ten feet or more in length, allows the worker operating the apparatus 10 to easily hold the clamp 12 in the installation position and install it there without having to climb up a ladder or a work platform to the member 32.

With the clamp 12 held in the installation position on the member 32, the method of the invention next includes drivingly engaging the end portion 28 of the clamp bolt 24 with the socket means 36, and then rotating the socket means to drive or tighten the bolt to the desired position shown in FIG. 4. In order for the socket means 36 to drivingly engage the bolt end portion 28, the inner socket body 72 is positioned in an extended or bolt driving position in which the bolt end portion is received in the inner socket body opening 76 while the clamp 12 is supported on the socket housing 42 between the cradle members 46. As shown in FIG. 4, the preferred extended position is a position in which the distal end of the inner socket body 72 is generally aligned in a common plane with the distal end of outer socket body 70. However, it will be readily appreciated by those skilled in the art that the extended position may be any position in which the bolt end portion 28 is received in the inner socket body opening 76 while the clamp 12 is received in the slot 48 formed between the two cradle members 46, whether the distal end of the inner socket body 72 is within, or out of, the distal end of the outer socket body 70.

In the preferred method of the invention, the driving engagement between the inner socket body 72 and the bolt end portion 28 is made initially when the clamp 12 is positioned in the clamp operating position adjacent to or on the clamp support means 34 while the inner socket body 72 is positioned in the extended or bolt driving position. That is, when the inner socket body 72 is in the bolt driving position, the bolt end portion 28 is received in the inner socket body opening 76 as the clamp 12 is positioned in the clamp operating position. These preferred simultaneous steps of clamp positioning and bolt end portion engaging can be appreciated best with reference to FIG. 4 which shows the clamp 12 in the clamp operating position and the inner socket body 72 in the extended position. Although the clamp positioning and bolt engaging steps are preferably performed simultaneously, those skilled in the art will readily appreciate that the bolt end portion 28 may be initially engaged by the inner socket 72 after the clamp is guided to the installation position on the member 32.

The step of rotating the socket means 36 includes rotating the drive shaft 84 about its longitudinal axis. As indicated in FIG. 4, the rotation of the drive shaft 84 rotates the inner socket body 72 to drive the clamp bolt 24. In the preferred form of the invention, the drive shaft 84 includes the driving end 106 exposed at the proximal end of the extension member 40 opposite the distal end connected to the socket housing 42 and the step of rotating the drive shaft may be accomplished using a suitable wrench or ratchet. However, any suitable means for engaging and rotating the drive shaft may be employed.

After the clamp bolt 24 is tightened to the desired position, the method of the invention next includes drivingly engaging the clamp nut 26 with the socket means 36, and then rotating the socket means until the nut is in the desired position on the bolt as shown in FIG. 5. In order to engage the clamp nut 26, the inner socket body 72 must be moved to a retracted, nut driving position relative to the outer socket body 70. In this retracted position, the inner socket body 72 is drivingly engaged with the outer socket body 70, but it is retracted from the distal end of the outer socket body sufficiently to allow the outer socket body opening 74 to drivingly engage the clamp nut 26. Rotating the drive shaft 84 rotates the inner socket body 72 which imparts the rotational force to the outer socket body 70 so that it may drive the nut 26. Once the clamp nut 26 is tightened, the apparatus 10 may be withdrawn leaving the clamp 12 properly installed on the beam or other member 32.

In the illustrated form of the invention the position of the inner socket body 72 is determined by the socket position controlling means 86. The socket position controlling means 86 maintains the inner socket body 72 in the extended position by contacting lower end of the upper stop member 88 with the catch end 98 of the trigger member 96 as shown in FIG. 4. This contact retains the drive shaft 84 in the illustrated longitudinal position within the extension member 40 to maintain the inner socket 72 in the extended position, but still allows the shaft, and the two socket bodies, to rotate with respect to the extension member. The inner socket body 72 is preferably moved to the retracted position shown in FIG. 5 by pivoting the catch end 98 of the trigger member 96 out of the catch position shown in FIG. 4 to enable the drive shaft 84 to shift downwardly with respect to the extension member 40. The catch end 98 of the trigger member 96 is adapted to snap back into the catch position to extend into the groove 95 and thereby retain the drive shaft 84 in the longitudinal position shown in FIG. 5, in which the drive shaft may be rotated to drive both sockets 70 and 72. Although the force for shifting the drive shaft 84 and inner socket body 72 downwardly may be provided by gravity, in the preferred form of the invention the drive shaft is biased downwardly by the positioning spring 102.

The above described preferred embodiments are intended to illustrate the principles of the invention, but not to limit the scope of the invention. Various other embodiments and modifications to these preferred embodiments may be made by those skilled in the art without departing from the scope of the following claims.

For example, the cross sectional shape of the outer socket body opening 74 may be any shape suited to engage the clamp nut 26 and need not be restricted to the twelve point shape illustrated in the FIGURES. Similarly, the cross sectional shape of the inner socket body opening 76 may be any suitable shape although a square shape is shown for purposes of illustration. Also, the outer cross sectional shape of the inner socket body 72 may be any desired shape capable of drivingly engaging the outer socket body 70. The "six-plus-two" point shape illustrated in the FIGURES is preferred because it leaves more material around the inner socket opening 76 than if a hexagon shape were used.

Furthermore, although the method of the invention is described particularly for installing top beam "C" clamps, those skilled in the art will readily appreciate that the steps may be reversed for removing a previously installed clamp. Also, devices other than top beam "C" clamps may be operated with the apparatus and method of the invention.

I claim:

1. A method for operating a clamp having a clamp body including a jaw through which is threaded a bolt with an end portion by which the bolt is rotated about its longitudinal axis to thread and to tighten toward an opposing jaw on the clamp body; and also having a nut with a diameter larger than the bolt end portion; and assembled to operate when the nut is threadedly received on a portion of the bolt adjacent to the bolt end portion, and the bolt is threaded through the jaw to position the bolt end portion and the nut outside a grip area between the two jaws, the method comprising the steps of:

(a) positioning and maintaining the clamp body in a clamp operating position adjacent to clamp supporting means thereby preventing rotation of the clamp body relative to the clamp supporting means in response to the rotation of the clamp bolt and nut about the bolt longitudinal axis;

(b) holding the clamp in an installation position, with the clamp supporting means;

(c) drivingly engaging the clamp bolt end portion with socket means connected to the clamp supporting means;

(d) rotating the socket means while drivingly engaged with the bolt end portion thereby rotating the clamp bolt to a desired position while the clamp body is maintained in the clamp operating position adjacent to the clamp supporting means;

(e) drivingly engaging the clamp nut with the socket means; and (f) rotating the socket means while drivingly engaged with the clamp nut thereby rotating the nut to a desired position while the clamp body is maintained in the clamp operating position adjacent to the clamp supporting means.

2. The method of claim 1 including the step of:

(a) maintaining the socket means in a bolt driving position in which the socket means drivingly engages the bolt end portion when the clamp is maintained in the clamp operating position adjacent to the clamp supporting means.

3. The method of claim 2 wherein the step of drivingly engaging the clamp nut includes:
   (a) moving the socket means to a nut driving position and maintaining the socket means in the nut driving position.

4. The method of claim 3 wherein the socket means includes an elongated outer socket body with an elongated inner socket body slidingly received therein, and the step of maintaining the socket means in a bolt driving position includes:
   (a) positioning the inner socket body in an extended position in which the bolt end portion is received in an inner socket body opening.

5. The method of claim 4 wherein the step of moving the socket means to the nut driving position includes:
   (a) retracting the inner socket body in the outer socket body to a retracted position in which the inner socket body drivingly engages the outer socket body, and the outer socket body drivingly engages the clamp nut.

6. The method of claim 5 wherein the clamp supporting means includes an extension member, and further including the step of:
   (a) guiding the clamp to the installation position with the extension member.

7. The method of claim 6 wherein the step of rotating the socket means while drivingly engaged with the bolt end portion and while drivingly engaged with the clamp nut includes:
   (a) rotating a drive shaft connected to the inner socket and positioned adjacent to the extension member.

8. The method of claim 7 including the steps of:
   (a) contacting an upper stop member with a trigger member connected to the extension member thereby maintaining the inner socket body in the extended position; and
   (b) extending a portion of the trigger member into a circumferential groove formed in the drive shaft thereby maintaining the inner socket body in the retracted position.

9. A method for operating a clamp having a clamp body including a jaw through which is threaded a bolt with an end portion by which the bolt is rotated about its longitudinal axis to thread and to tighten toward an opposing jaw on the clamp body; and also having a nut with a diameter larger than the bolt end portion, and assembled to operate when the nut is threadedly received on a portion of the bolt adjacent to the bolt end portion, and the bolt is threaded through the jaw to position the bolt end portion and the nut outside a grip area between the two jaws, the method comprising the steps of:
   (a) positioning and maintaining the clamp body in a clamp operating position adjacent to clamp supporting means thereby preventing rotation of the clamp body relative to the clamp supporting means in response to the rotation of the clamp bolt and nut about the bolt longitudinal axis;
   (b) drivingly engaging the clamp bolt end portion with socket means as the clamp body is positioned in the clamp operating position, the socket means being connected to the clamp supporting means;
   (c) holding the clamp in an installation position, with the clamp supporting means;
   (d) rotating the socket means while drivingly engaged with the bolt end portion thereby rotating the clamp bolt to a desired position while the clamp body is maintained in the clamp operating position adjacent to the clamp supporting means;
   (e) drivingly engaging the clamp nut with the socket means; and
   (f) rotating the socket means while drivingly engaged with the clamp nut thereby rotating the nut to a desired position while the clamp body is maintained in the clamp operating position adjacent to the clamp supporting means.

10. The method of claim 9 wherein the step of rotating the socket means includes the step of:
    (a) rotating driving means connected to the socket means.

11. The method of claim 9 including the steps of:
    (a) guiding the clamp to the installation position, with an extension member connected to the clamp supporting means;
    (b) rotating the clamp bolt thereby gripping a member on which the clamp is being installed;
    (c) rotating the clamp nut to contact the jaw through which the bolt is threaded thereby locking the bolt in the position gripping the member on which the clamp is being installed; and
    (d) removing the clamp supporting means from the clamp.

12. The method of claim 9 further comprising the step of:
    (a) maintaining the socket means in a bolt driving position with socket position controlling means, the socket means drivingly engaging the bolt end portion while the socket means is in the bolt driving position and the clamp body is in the clamp operating position.

13. The method of claim 12 wherein the step of drivingly engaging the clamp nut with the socket means further includes the steps of:
    (a) positioning the socket means in a nut driving position in which the socket means drivingly engages the clamp nut while the clamp body is in the clamp operating position; and
    (b) maintaining the socket means in the nut driving position with the socket position controlling means connected to the socket means.

* * * * *